United States Patent
Cinco

(10) Patent No.: US 9,022,466 B2
(45) Date of Patent: May 5, 2015

(54) ARMREST ASSEMBLY

(75) Inventor: Omar Cinco, Farmington Hills, MI (US)

(73) Assignee: FCA US LLC, Auburn Hills, MI (US)

(*) Notice: Subject to any disclaimer, the term of this patent is extended or adjusted under 35 U.S.C. 154(b) by 714 days.

(21) Appl. No.: 13/329,427

(22) Filed: Dec. 19, 2011

(65) Prior Publication Data

US 2013/0153447 A1    Jun. 20, 2013

(51) Int. Cl.
*A47C 7/62*   (2006.01)
*A47C 7/54*   (2006.01)
*B60N 2/46*   (2006.01)

(52) U.S. Cl.
CPC ............ *B60N 2/4686* (2013.01); *B60N 2/4646* (2013.01)

(58) Field of Classification Search
USPC .................. 297/188.19, 411.35, 188.14, 115, 297/411.2, 411.21
See application file for complete search history.

(56) References Cited

U.S. PATENT DOCUMENTS

| | | | | |
|---|---|---|---|---|
| 3,025,108 A * | 3/1962 | Teague, Jr. .................... 297/327 |
| 3,140,119 A * | 7/1964 | Offner ........................ 297/411.3 |
| 4,685,729 A | 8/1987 | Heesch et al. |
| 4,934,750 A * | 6/1990 | Eichler et al. ................ 296/37.8 |
| 5,571,274 A * | 11/1996 | Holstensson ............ 297/411.38 |
| 5,732,944 A | 3/1998 | Mayer |
| 5,732,994 A * | 3/1998 | Stancu et al. ................ 296/37.8 |
| 5,746,480 A * | 5/1998 | Bonutti ..................... 297/411.35 |
| 5,752,683 A * | 5/1998 | Novis et al. .................... 248/118 |
| 5,845,965 A * | 12/1998 | Heath et al. ............... 297/188.19 |
| 5,884,975 A * | 3/1999 | Su .............................. 297/411.35 |
| 6,007,155 A | 12/1999 | Hara et al. |
| 6,010,193 A | 1/2000 | Hara et al. |
| 6,045,173 A * | 4/2000 | Tiesler et al. ................. 296/37.8 |
| 6,050,634 A * | 4/2000 | Yamagishi et al. ........... 297/115 |
| 6,250,729 B1 | 6/2001 | Allison et al. |
| 6,419,314 B1 * | 7/2002 | Scheerhorn .............. 297/188.19 |
| 6,719,344 B2 * | 4/2004 | Ono et al. ................... 296/24.34 |
| 6,719,367 B2 * | 4/2004 | Mic et al. .................. 297/188.19 |
| 6,789,831 B2 | 9/2004 | Schmidt et al. |
| 7,014,255 B2 * | 3/2006 | Amamiya et al. ....... 296/190.08 |
| 7,114,772 B2 * | 10/2006 | Kobayashi et al. ...... 297/188.04 |
| 7,387,341 B1 * | 6/2008 | Tsai ........................... 297/411.35 |
| 7,537,287 B2 | 5/2009 | Wieczorek et al. |
| 7,766,408 B2 | 8/2010 | Lota et al. |
| 7,770,953 B2 * | 8/2010 | Koarai ......................... 296/24.34 |
| 7,850,244 B2 * | 12/2010 | Salewski .................. 297/411.32 |
| 7,878,567 B2 * | 2/2011 | Schneider et al. ......... 296/24.34 |
| 8,167,348 B2 * | 5/2012 | Fesenmyer ................ 296/24.34 |
| 8,348,205 B2 * | 1/2013 | Yang .......................... 248/118.1 |
| 8,474,914 B2 * | 7/2013 | Chen et al. ............... 297/411.37 |
| 2004/0206858 A1 * | 10/2004 | Rockafellow et al. ........ 248/118 |
| 2005/0189807 A1 * | 9/2005 | Norman et al. .......... 297/411.35 |
| 2006/0042857 A1 * | 3/2006 | Catton et al. .................. 180/334 |
| 2006/0166557 A1 * | 7/2006 | Ishikawa et al. .............. 439/610 |

(Continued)

*Primary Examiner* — Philip Gabler
(74) *Attorney, Agent, or Firm* — Ralph E Smith

(57) ABSTRACT

An armrest assembly may include a base member, an armrest member, a mechanism and a biasing member. The armrest member may be linearly movable relative to the base member between a first position and a second position. The mechanism may be associated with the armrest member and may be movable between an engaged configuration restricting linear movement of the armrest member relative to the base member and a disengaged configuration allowing linear movement of the armrest member relative to the base member. The biasing member may bias the armrest member in a linear direction from the second position toward the first position.

17 Claims, 6 Drawing Sheets

(56) References Cited

U.S. PATENT DOCUMENTS

| | | |
|---|---|---|
| 2006/0238011 A1* | 10/2006 | Bedford et al. .......... 297/411.35 |
| 2006/0279123 A1 | 12/2006 | Bazinski et al. |
| 2007/0262632 A1* | 11/2007 | Cody et al. ............... 297/411.35 |
| 2008/0084103 A1* | 4/2008 | Bock ........................ 297/411.35 |
| 2008/0191104 A1* | 8/2008 | Wang ............................ 248/118 |
| 2010/0207414 A1* | 8/2010 | Tsuda et al. ................. 296/37.8 |
| 2010/0289317 A1 | 11/2010 | Cone |
| 2011/0236130 A1* | 9/2011 | Klein et al. ...................... 404/83 |

* cited by examiner

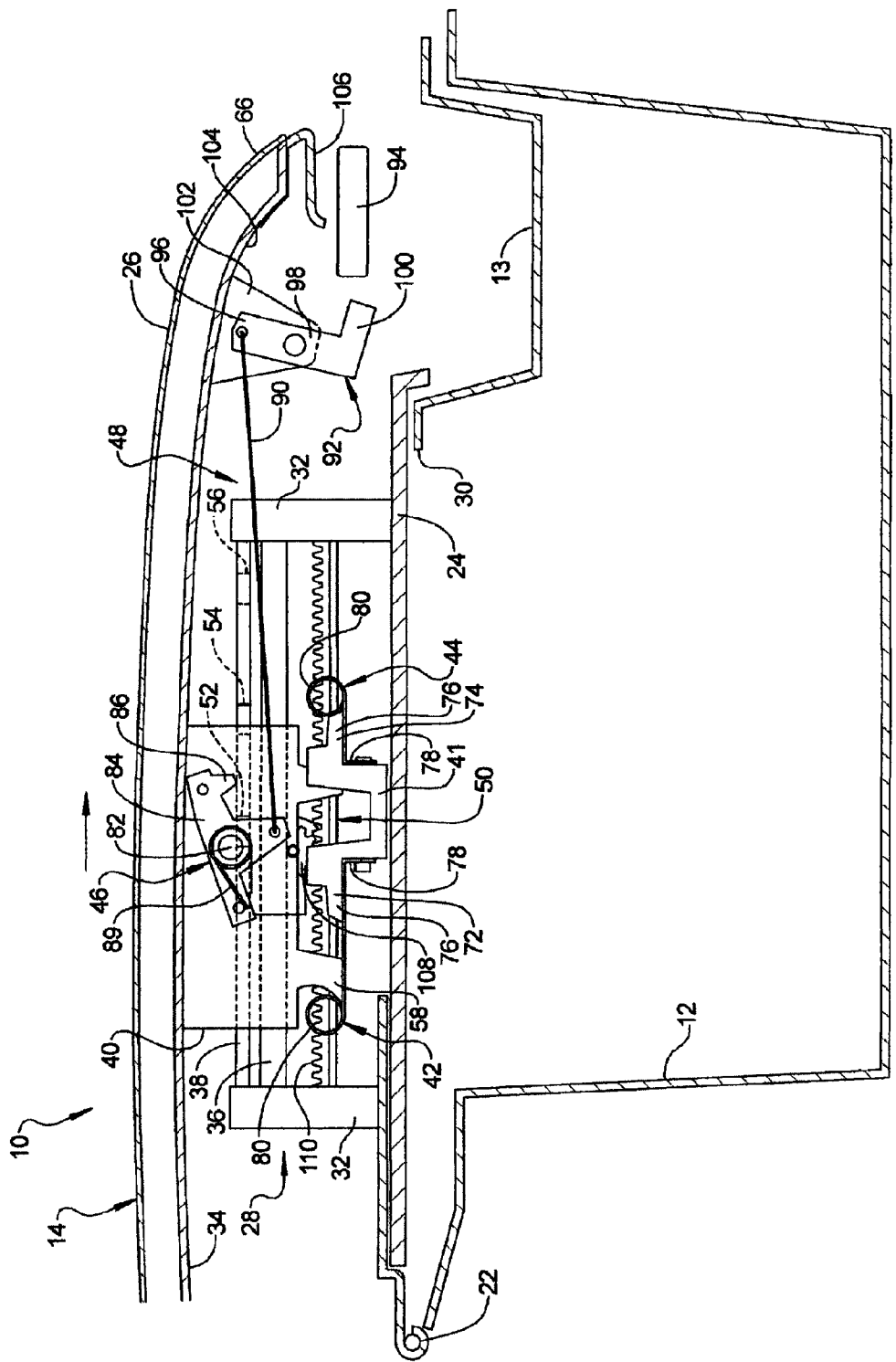

ARMREST ASSEMBLY

FIELD

The present disclosure relates to an armrest, and more particularly, to an armrest with a self-positioning mechanism.

BACKGROUND

Many vehicles include a center-console having a storage compartment and an armrest. The armrest may at least partially cover the storage compartment to conceal its contents. Some vehicles include a stand-alone armrest that is not associated with a console. In either configuration, the armrest may provide a comfortable surface upon which an occupant of the vehicle may rest his or her arm. The armrest may include a cushioning material to improve the comfort of the armrest and the overall comfort of the interior of the vehicle.

SUMMARY

The present disclosure provides an armrest assembly that may include a base member, an armrest member, a mechanism and a biasing member. The armrest member may be linearly movable relative to the base member between a first position and a second position. The mechanism may be associated with the armrest member and may be movable between an engaged configuration restricting linear movement of the armrest member relative to the base member and a disengaged configuration allowing linear movement of the armrest member relative to the base member. The biasing member may bias the armrest member in a linear direction from the second position toward the first position.

In some embodiments, the armrest assembly may include a second biasing member biasing the armrest member in a linear direction from a third position toward the first position. The first position may be between the second and third positions.

In some embodiments, the armrest assembly may include a damper mechanism resisting the linear motion of the armrest member from the second position to the first position.

In some embodiments, the armrest assembly may include a hinge connected to the armrest member allowing the armrest member to rotate relative to a storage bin.

In some embodiments, the mechanism may include a positioning member, an engagement lever, and an actuation member. The positioning member may be linearly fixed relative to the base member. The engagement lever may be supported for rotation relative to the armrest member and linear motion with the armrest member relative to the positioning member. The actuation member may be movable to cause corresponding rotational movement of the engagement lever to move the mechanism between the engaged configuration and the disengaged configuration. The engagement lever may engage the positioning member in the engaged configuration.

In some embodiments, the positioning member may include first and second engagement features corresponding to the first and second positions of the armrest. The engagement lever may engage one of the first and second engagement features in the engaged configuration.

In some embodiments, the mechanism may include a latch lever supported for rotation relative to the armrest member and linearly movable with the armrest member relative to the base member. The latch lever may be in communication with the actuation member and may be coupled to the engagement lever by a link member.

In some embodiments, the armrest assembly may include a second biasing member urging the mechanism toward the engaged configuration. One of both of the first and second biasing members could be a constant-force spring member.

In some embodiments, the armrest assembly may include rail members and a slide member linearly movable relative to the rail members and fixed relative to the armrest member.

The present disclosure also provides a console assembly that may include a storage bin, a base member, an armrest member, and engagement lever and a biasing assembly. The base member may be mounted to the storage bin for movement relative thereto between an open position and a closed position. The armrest member may be mounted to the base member and movable with the base member relative to the storage bin and between the open and closed positions. The armrest member may also be movable relative to the base member between a first position and a second position. The engagement lever may be mounted for rotation relative to the armrest member between a locked position and an unlocked position and movement with the armrest member relative to the base member between the first and second positions. The biasing assembly may bias the armrest member toward the first position.

In some embodiments, the armrest member may be movable relative to the base member between the first position and a third position. The first position may be disposed between the second and third positions. In some embodiments, the biasing assembly may include first and second biasing members, the first biasing member may bias the armrest member toward the first position when the armrest member is between the first and second positions. The second biasing member may bias the armrest member toward the first position when the armrest member is between the first and third positions. In some embodiments, the first and second biasing members may include first and second constant-force spring members, respectively.

In some embodiments, the console assembly may include a spring member biasing the engagement lever toward the locked position.

In some embodiments, the console assembly may include a positioning member including first, second and third apertures corresponding to the first, second and third positions, respectively. The engagement lever may engage one of the first, second and third apertures in the locked position.

In some embodiments, the console assembly may include a damper mechanism resisting the motion of the armrest member from the second position to the first position and resisting motion of the armrest member from the third position to the first position.

In some embodiments, the console assembly may include an actuation member, a link member coupled to the actuation member and the engagement lever. Application of a force onto the actuation member may cause corresponding movement of the link member. Movement of the link member may cause corresponding movement of the engagement lever from the locked position to the unlocked position, thereby allowing the armrest to move between the first and second positions.

In some embodiments, the movement of the armrest member between the first and second positions is substantially linear.

In some embodiments, the console assembly may include a tray fixed relative to the storage bin. The armrest member may restrict access to the tray when the armrest member is in the first position and may allow access to the tray when the armrest member is in the second position.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIG. 6 is a cross-sectional view of the console and the armrest assembly in the unlocked condition between the rearward position and the home position.

DETAILED DESCRIPTION

Figure 1:
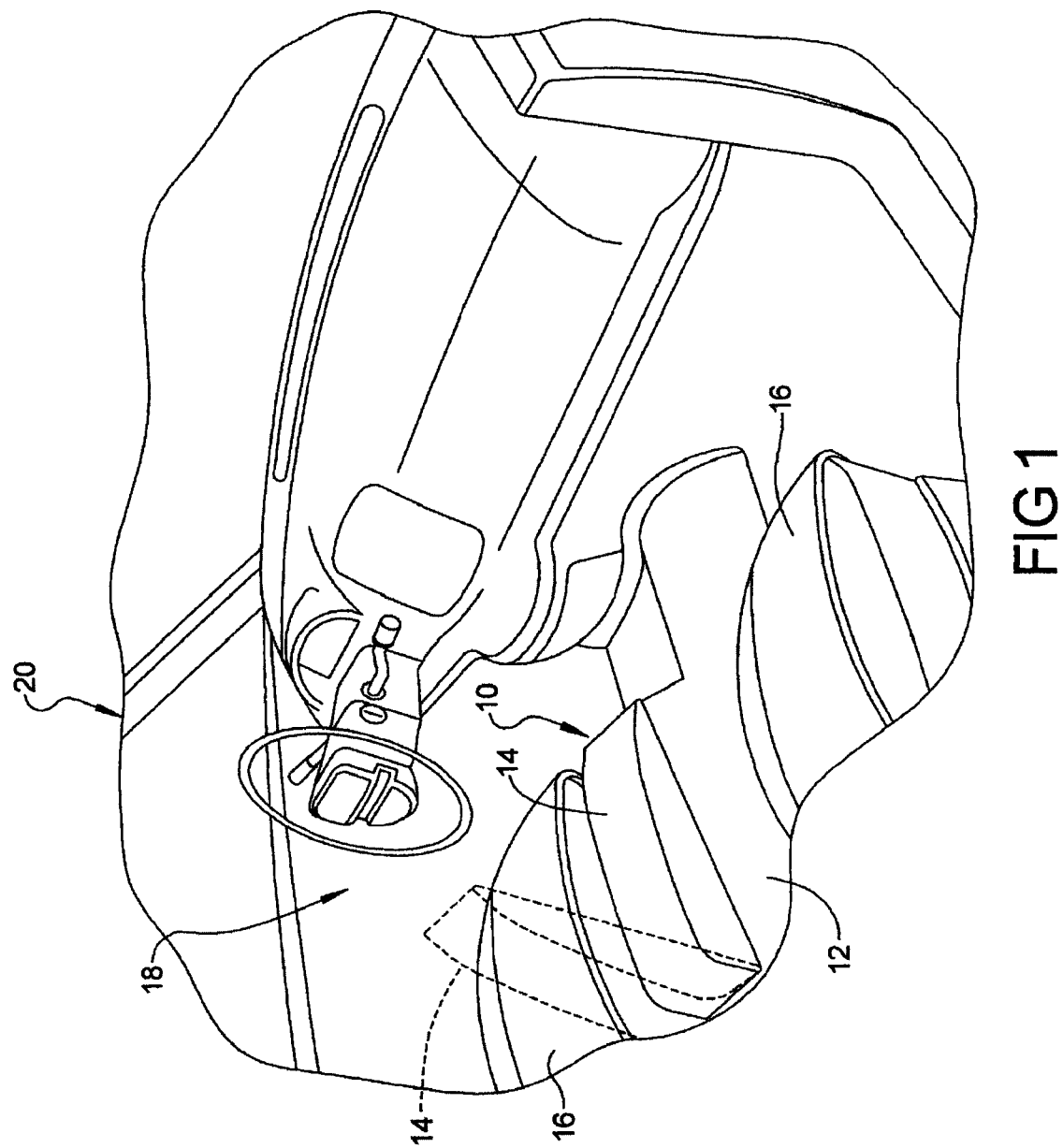
FIG. 1 is a perspective view of an interior of a vehicle having a console and an armrest assembly according to the principles of the present disclosure.

In an exemplary embodiment and with reference to FIGS. 1-6, a console 10 is provided that may include a storage bin or compartment 12, a storage tray 13, and an armrest assembly 14. The console 10 may be disposed adjacent one or more seats 16 in an interior 18 of a vehicle 20, for example. In some embodiments, the console 10 may be disposed between a pair of seats 16, such as a driver's seat and a front passenger's seat, for example. An occupant of the vehicle 20 may store his or her personal belongings and/or other items in the storage compartment 12 and/or the storage tray 13 and may rest his or her arm on the armrest assembly 14, for example. The armrest assembly 14 may be mounted to the storage compartment 12 and may be pivotable about a hinge 22 relative to the storage compartment 12 and storage tray 13 between a closed position (shown in solid lines in FIG. 1) restricting access to the storage compartment 12 and an open position (shown in phantom lines in FIG. 1) allowing access to the storage compartment 12.

The armrest assembly 14 may include a base member 24, an armrest member 26, and an adjustment mechanism 28. The armrest member 26 may be selectively linearly movable relative to the base member 24, storage compartment 12 and storage tray 13 between a forward position (FIG. 4) and a rearward position (FIG. 5). As will be subsequently described, the adjustment mechanism 28 may be configured to move the armrest member 26 from the forward or rearward position to a home position (FIG. 2) in response to a user actuating an actuation linkage 48.

The base member 24 may be connected to the storage compartment 12 by the hinge 22 and may extend across an opening 30 of the storage compartment 12 when the armrest assembly 14 is in the closed position. The armrest member 26 may be mounted to the base member 24 and may be movable relative thereto between the forward position and the rearward position. A plurality of support members 32 may extend upward from the base member 24 toward the armrest member 26.

The armrest member 26 may include a generally hollow shell 34 that cooperates with the base member 24 to house and substantially enclose the adjustment mechanism 28. In some embodiments, an exterior of the shell 34 may include a padding material and/or an upholstery material to improve the comfort and aesthetics of the armrest assembly 14.

The adjustment mechanism 28 may include one or more rails 36, a positioning member 38, a slide member 40, a spring holder 41, first and second spring members 42, 44, a slide lever 46, an actuation linkage 48, and a damping device 50. The one or more rails 36 may be supported by the support members 32 and may extend substantially parallel to the base member 24. The one or more rails 36 may be a pair of parallel cylindrical rods and/or one or more bars having polygonal cross sections, for example.

The positioning member 38 may also be supported by the support members 32 and may extend substantially parallel to the one or more rails 36. The positioning member 38 could be a substantially flat plate, rod or bar, for example. In some embodiments, the positioning member 38 could be integrally formed with one or more rails 36. The positioning member 38 may include rearward, home and forward apertures 52, 54, 56 that extend at least partially therethrough toward the base member 24. As will be subsequently described, the rearward aperture 52 may be associated with the rearward position of the armrest member 26, the home aperture 54 may be associated with the home position of the armrest member 26, and the forward aperture 56 may be associated with the forward position of the armrest member 26. In some embodiments, the positioning member 38 could include fewer or more apertures than the apertures 52, 54, 56 described above.

The slide member 40 may be fixedly attached to any suitable surface of the armrest member 26 and may slidably engage the one or more rails 36. In this manner, the slide member 40 and the armrest member 26 can be slid in linear fore and aft directions. The slide member 40 may include first and second hook members 58, 60. The first hook member 58 may extend downward from the slide member 40 and may curve toward an aft end 64 of the armrest member 26. The second hook member 60 may extend downward from the slide member 40 and may curve toward a front end 66 of the armrest member 26.

The spring holder 41 may be fixed relative to the base member 24 and may include first and second opposing sides 68, 70 and first and second arms 72, 74 that extend from the first and second sides 68, 70 in opposite directions. The first and second arms 72, 74 may include tapered ends 76.

The first and second spring members 42, 44 may each include a fixed end 78 and a curled portion 80. The fixed ends 78 of the first and second spring members 42, 44 may be attached to the first and second sides 68, 70, respectively. The first and second hook members 58, 60 of the slide member 40 may releasably engage the curled portions 80 of the first and second spring members 42, 44, respectively.

Figure 2:
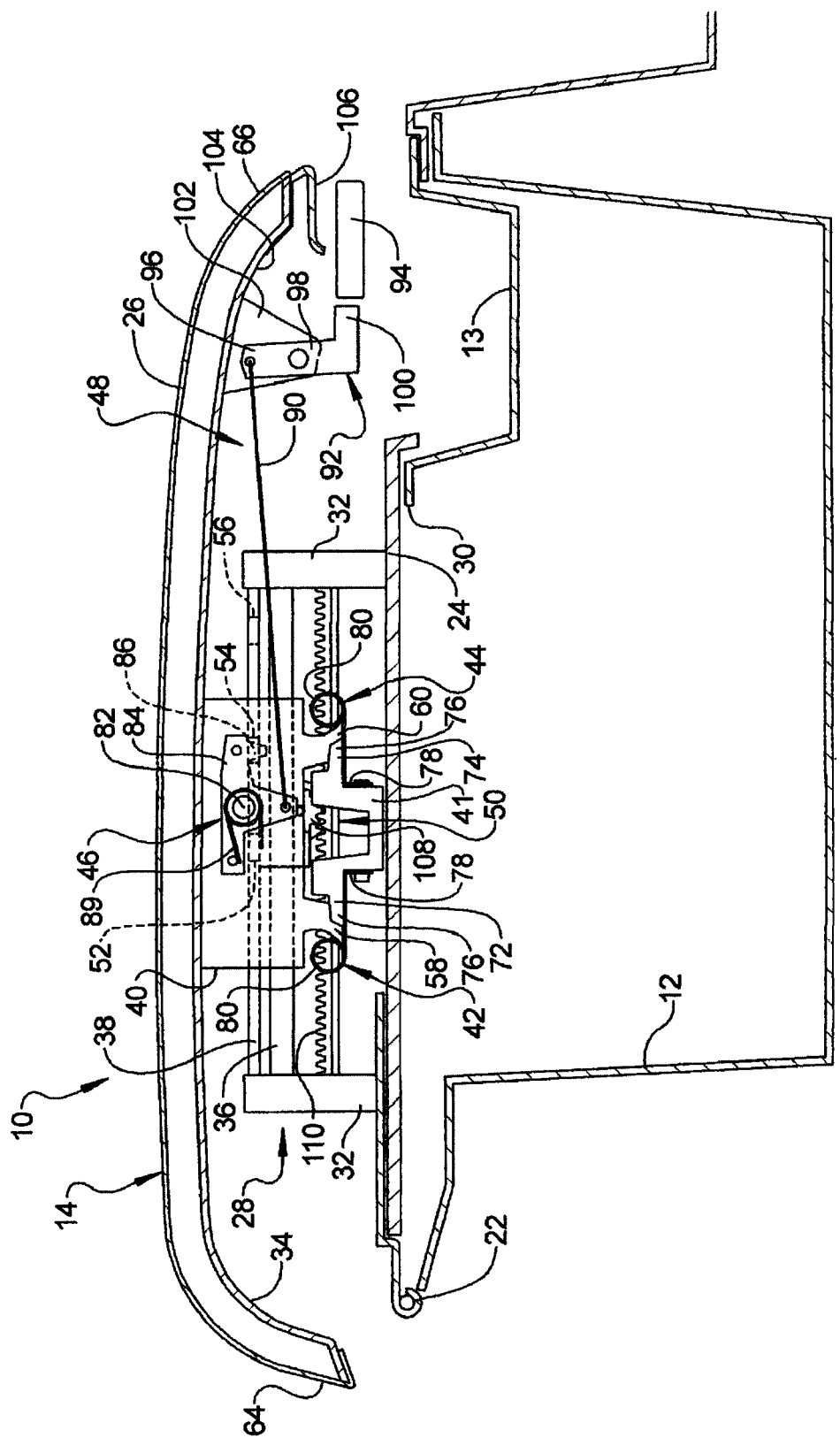
FIG. 2 is a cross-sectional view of the console and the armrest assembly in a home position and in a locked condition.
Figure 4:
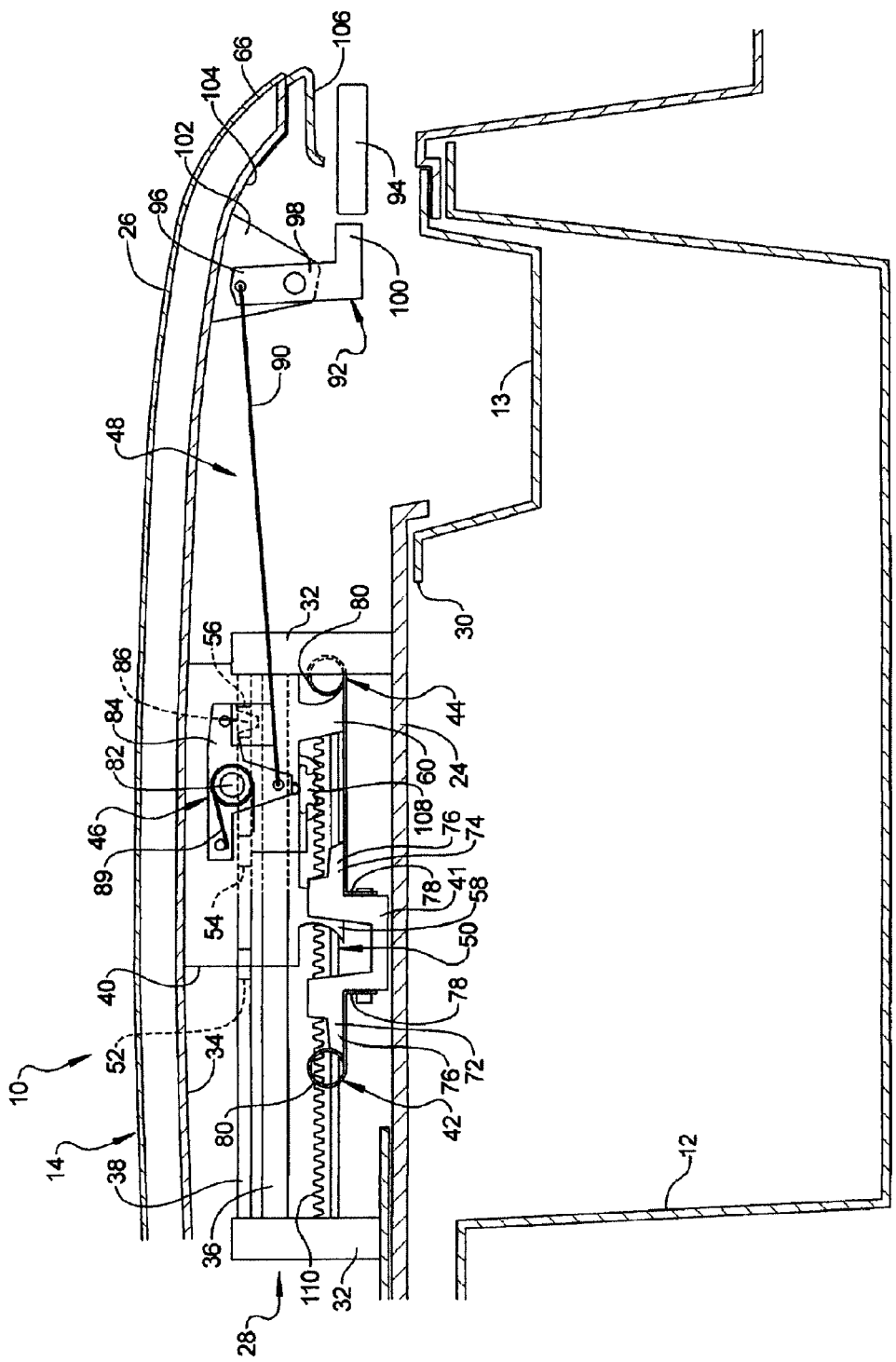
FIG. 4 is a cross-sectional view of the console and the armrest assembly in a forward position and in the locked condition.
Figure 5:
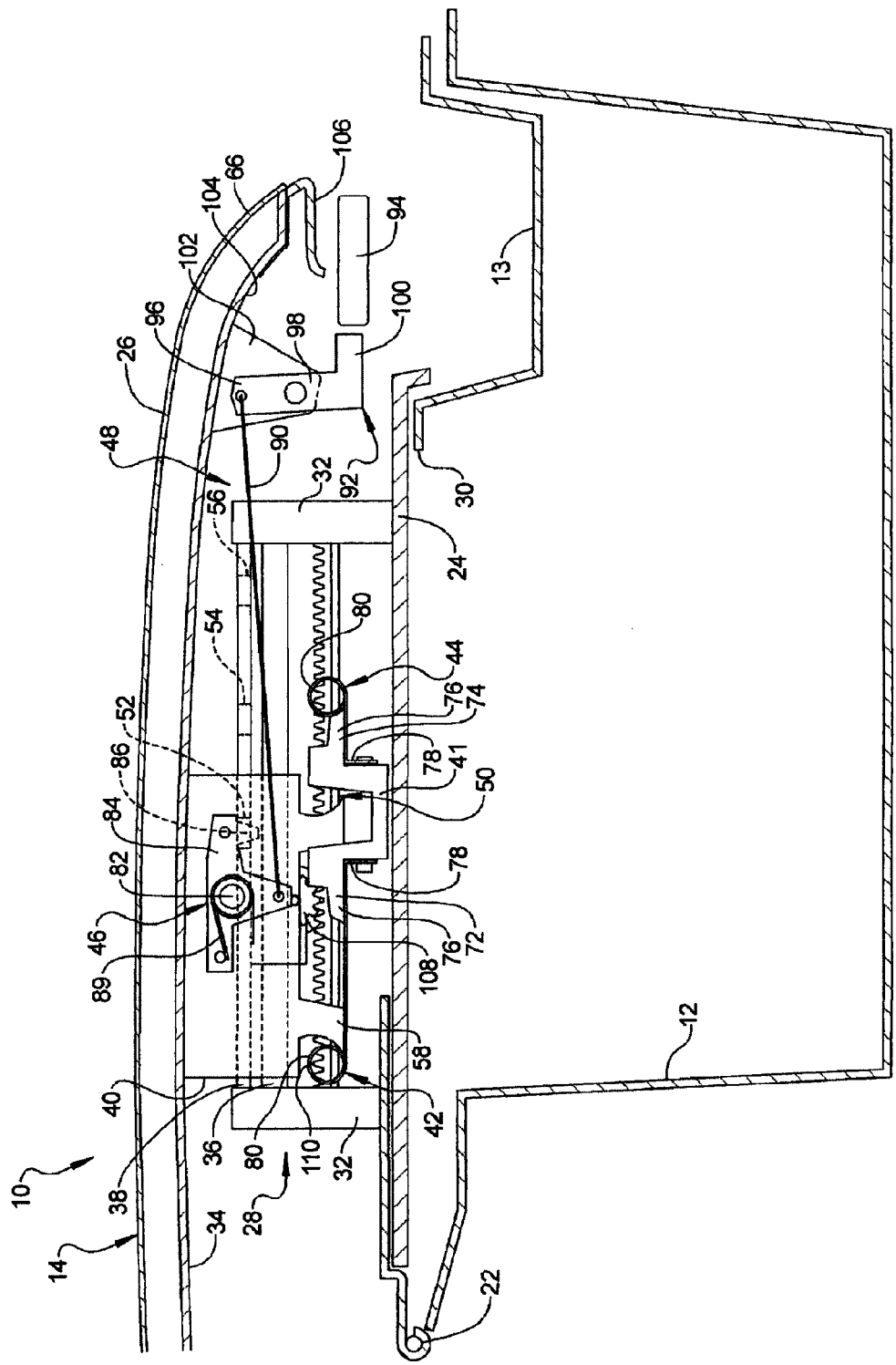
FIG. 5 is a cross-sectional view of the console and the armrest assembly in a rearward position and in the locked condition.

When the slide member 40 (and thus, the armrest member 26) move from the home position to the forward position, the curled portion 80 of the second spring member 44 may at least partially uncurl, as shown in FIG. 4. As the slide member 40 moves toward the forward position, the first spring member 42 may retract (i.e., curl inward toward the fixed end 78) until the curled portion 80 of the first spring member 42 contacts the first arm 72 of the spring holder 41 and the first hook member 58 disengages the first spring member 42 (FIG. 4). Similarly, when the slide member 40 (and thus, the armrest member 26) move from the home position to the rearward position, the curled portion 80 of the first spring member 42 may at least partially uncurl, as shown in FIG. 5. As the slide member 40 moves toward the rearward position, the second spring member 44 may retract (i.e., curl inward toward the fixed end 78) until the curled portion 80 of the second spring member 44 contacts the second arm 74 of the spring holder 41 and the second hook member 60 disengages the second spring member 44 (FIG. 5). The first and second spring member 42, 44 may bias the slide member 40 (and thus, the armrest member 26) toward the home position (FIG. 2). Because the first and second spring members 42, 44 are curl springs, the biasing force that each of the spring members 42, 44 applies remains substantially constant, regardless of an amount that the spring member 42, 44 is extended or retracted. It will be appreciated that the spring members 42, 44 could be any other suitable type of springs, such as helical coil springs, for example.

Figure 3:
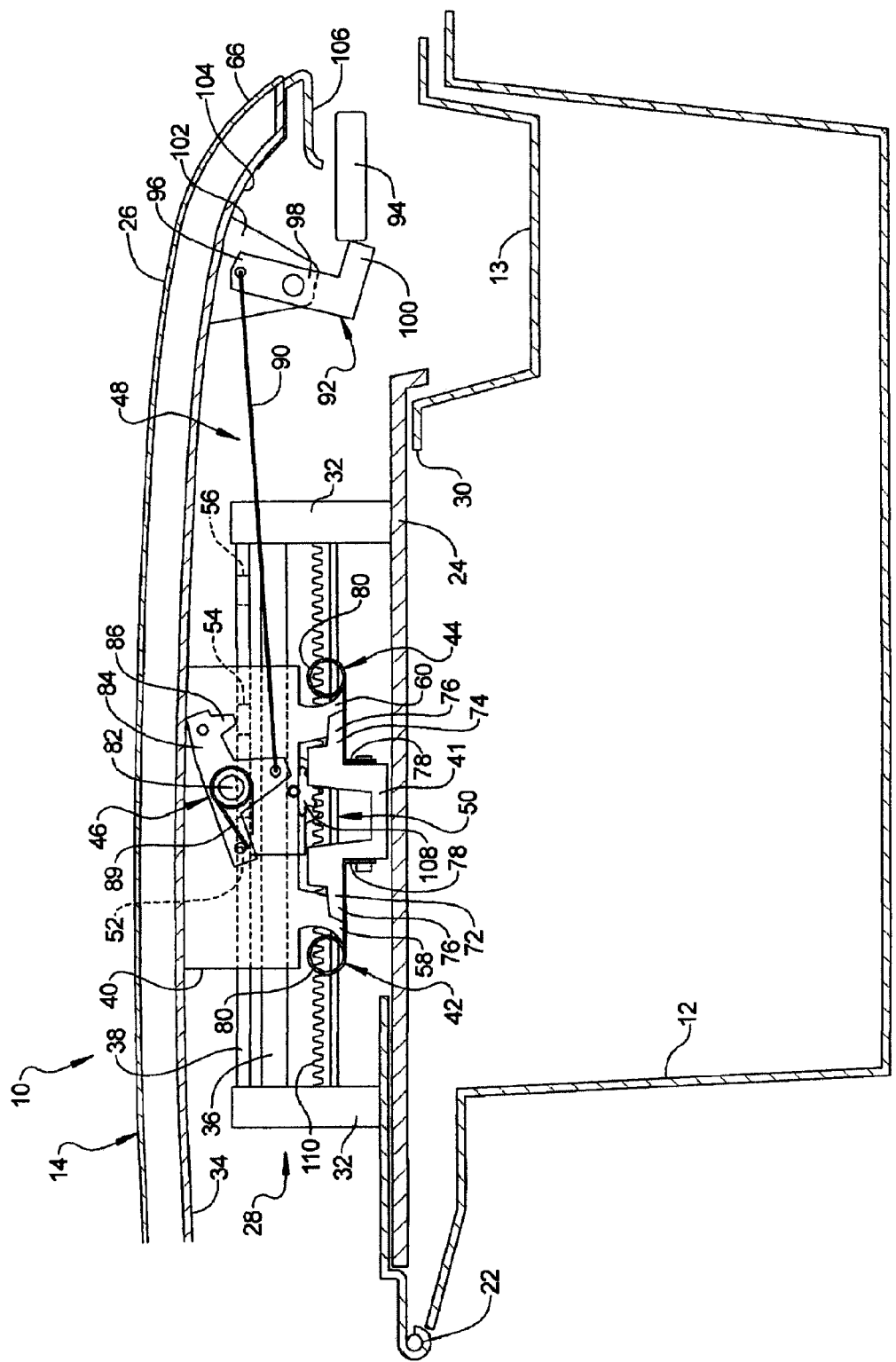
FIG. 3 is a cross-sectional view of the console and the armrest assembly in an unlocked condition.

The slide lever 46 may be pivotably connected to the slide member 40 by an axle 82. The slide lever 46 may include a first arm 84 having a protrusion 86 extending therefrom. The slide lever 46 may also include a second arm 88 that is connected to the actuation linkage 48. In response to movement of the actuation linkage 48, the slide lever 46 may pivot about an axis defined by the axle 82 between a locked condition (FIGS. 2, 4 and 5) and an unlocked condition (FIGS. 3 and 6). In the locked condition, the protrusion 86 may engage one of the rearward, home and forward apertures 52, 54, 56. In the unlocked condition, the protrusion 86 may be disengaged from the apertures 52, 54, 56. A spring member 89 may rotationally bias the slide lever 46 toward the locked condition.

The actuation linkage 48 may include a rod or cable 90, a latch lever 92, and an actuation member 94. The latch lever 92 may include a first end 96, a central portion 98, and a second end 100. The cable 90 may interconnect the second arm 88 of the slide lever 46 with the first end 96 of the latch lever 92. The central portion 98 may be pivotably connected to a support member 102 extending from an inner surface 104 of the armrest member 26. The actuation member 94 may be a button or a latch, for example, or any other suitable member that may extend through an opening 106 defined by the armrest member 26 and may engage the second end 100 (shown schematically in FIGS. 2-6).

The damping device 50 may include a geared, rotating damper 108 and a damper rack 110. The damper 108 may be connected to the slide member 40 and/or the armrest member 26 and may be rotatable relative thereto. The damper rack 110 may be connected to the support members 32 or otherwise fixed relative to the base member 24 and the one or more rails 36. The damper 108 may meshingly engage the damper rack 110 such that the damper 108 rotates as the slide member 40 moves relative to the base member 24. The damper 108 may include an oil or other viscous fluid that resists rotation of the damper 108 relative to the damper rack 110. In this manner, the damping device 50 resists fore and aft motion of the slide member 40 and armrest member 26 relative to the base member 24. It will be appreciated that the damping device 50 could be any other type of damping device, such as a pneumatic piston/cylinder assembly, for example.

With continued reference to FIGS. 1-6, operation of the armrest assembly 14 will be described in detail. As described above, the armrest assembly 14 may be pivotable about the hinge 22 relative to the storage compartment 12 between open and closed positions (FIG. 1). The armrest member 26 is selectively linearly movable relative to the storage compartment 12 and the base member 24 between the forward position (FIG. 4) and the rearward position (FIG. 5). In some embodiments, the user may access the storage tray 13 when the armrest member 26 is in the rearward position, while the armrest member 26 may restrict access to the storage tray 13 in the home position and/or the forward position.

A user may move the armrest member 26 relative to the storage compartment 12 and the base member 24 by applying a force pushing the actuation member 94 inward (FIG. 3). This movement of the actuation member 94 causes rotation of the latch lever 92, which in turn applies a force to the cable 90 pulling the cable 90 toward the front end 66 of the armrest member 26. This movement of the cable 90 causes the slide lever 46 to rotate relative to the positioning member 38 into the unlocked condition, as shown in FIG. 3. With the slide lever 46 in the unlocked condition, the user may then apply a forward or backward force to the armrest member 26 to slide the armrest member 26 between the forward and rearward positions. Once the user has moved the armrest member 26 to a position between the rearward position and the home position or to a position between the home position and the forward position, the user may release the actuation member 94 and still move the armrest member 26 relative to the base member 24 until the protrusion 86 on the slide lever 46 becomes aligned with one of the rearward, home or forward apertures 52, 54, 56. When the protrusion 86 is moved into alignment with one of the rearward, home or forward apertures 52, 54, 56, the spring member 89 will urge the protrusion 86 into engagement with that aperture 52, 54, 56 (i.e., the spring member 89 will urge the slide lever 46 into the locked condition).

If the armrest member 26 is in either the rearward or the forward position, and the user wants to return the armrest member 26 to the home position, the user need only depress the actuation member 94 a sufficient amount to move the slide lever in to the unlocked condition, and the respective one of the first and second spring members 42, 44 will urge the armrest member 26 back to the home position without any additional force applied by the user. That is, the first spring member 42 will urge the armrest member 26 back to the home position from the rearward position (or from any position between the rearward position and the home position), and the second spring member 44 will urge the armrest member 26 back to the home position from the forward position (or from any position between the forward position and the home position). When the armrest member 26 reaches the home position, the spring member 89 may urge the slide lever 46 back into the locked condition to retain the armrest member 26 in the home position. In this manner, the armrest assembly 14 is a self-positioning assembly, as the adjustment mechanism 28 is operable in the manner described above to self-position the armrest member 26 at the home position in response to actuation of the actuation linkage 48.

As described above, the damping device 50 resists fore and aft motion of the armrest member 26 relative to the base member 24. The resistance that the damping device 50 applies can be tuned to a desired level so that the armrest member 26 is not returned to the home position by the spring members 42, 44 too quickly. It will be appreciated that in some embodiments, the damping device 50 may not be necessary or desirable and that the self-positioning function of the armrest assembly 14 can be accomplished with or without the damping device 50.

What is claimed is:
1. An assembly comprising:
a base member;
an armrest member linearly movable relative to the base member between a first position and a second position;
a mechanism associated with the armrest member and movable between an engaged configuration restricting linear movement of the armrest member relative to the base member and a disengaged configuration allowing linear movement of the armrest member relative to the base member;
a first biasing member biasing the armrest member in a linear direction from the second position toward the first position; and
a second biasing member biasing the armrest member in a linear direction from a third position toward the first position, the first position is between the second and third positions, the first biasing member being decoupled from the armrest member when the armrest member is between the first and third positions, the second biasing member being decoupled from the armrest member when the armrest member is between the first and second positions.

2. The assembly of claim 1 further comprising a damper mechanism resisting the linear motion of the armrest member from the second position to the first position.

3. The assembly of claim 1 further comprising a hinge connected to the armrest member and allowing the armrest member to rotate relative to a storage bin.

4. The assembly of claim 1, wherein the mechanism includes a positioning member linearly fixed relative to the base member, an engagement lever supported for rotation relative to the armrest member and linear motion with the armrest member relative to the positioning member, and an actuation member movable to cause corresponding rotational movement of the engagement lever to move the mechanism between the engaged configuration and the disengaged configuration, the engagement lever engaging the positioning member in the engaged configuration.

5. The assembly of claim 4, wherein the positioning member includes first and second engagement features corresponding to the first and second positions of the armrest, the engagement lever engaging one of the first and second engagement features in the engaged configuration.

6. The assembly of claim 4, wherein the mechanism includes a latch lever supported for rotation relative to the armrest member and linearly movable with the armrest member relative to the base member, the latch lever being in communication with the actuation member and coupled to the engagement lever by a link member.

7. The assembly of claim 1 further comprising a third biasing member urging the mechanism toward the engaged configuration.

8. The assembly of claim 1 further comprising rail members and a slide member linearly movable relative to the rail members and fixed relative to the armrest member, wherein the slide member is in contact with the first biasing member and is spaced apart from the second biasing member when the armrest member is between the first and second positions, and wherein the slide member is in contact with the second biasing member and is spaced apart from the first biasing member when the armrest member is between the second and third positions.

9. The assembly of claim 1, wherein the first biasing member includes a constant-force spring member.

10. A console assembly comprising:
a storage bin;
a base member mounted to the storage bin for movement relative thereto between an open position and a closed position;
an armrest member mounted to the base member and movable with the base member relative to the storage bin and between the open and closed positions, the armrest member being movable relative to the base member between a first position and a second position and between the first position and a third position, the first position being disposed between the second and third positions;
an engagement lever mounted for rotation relative to the armrest member between a locked position and an unlocked position and movement with the armrest member relative to the base member between the first and second positions;
a first biasing member biasing the armrest member toward the first position when the armrest member is between the first and second positions, the first biasing member being decoupled from the armrest member when the armrest member is between the first and third positions; and
a second biasing member biasing the armrest member toward the first position when the armrest member is between the first and third positions, the second biasing member being decoupled from the armrest member when the armrest member is between the first and second positions.

11. The console assembly of claim 10, further comprising a spring member biasing the engagement lever toward the locked position.

12. The console assembly of claim 11, further comprising a positioning member including first, second and third apertures corresponding to the first, second and third positions, respectively, the engagement lever engaging one of the first, second and third apertures in the locked position.

13. The console assembly of claim 10, further comprising a damper mechanism resisting the motion of the armrest member from the second position to the first position and resisting motion of the armrest member from the third position to the first position.

14. The console assembly of claim 10, wherein the first and second biasing members include first and second constant-force spring members, respectively.

15. The console assembly of claim 10, further comprising an actuation member, a link member coupled to the actuation member and the engagement lever, wherein application of a force onto the actuation member causes corresponding movement of the link member, wherein movement of the link member causes corresponding movement of the engagement lever from the locked position to the unlocked position, thereby allowing the armrest to move between the first and second positions.

16. The console assembly of claim 10, wherein movement of the armrest member between the first and second positions is substantially linear.

17. The console assembly of claim 10, further comprising a tray fixed relative to the storage bin, the armrest member restricting access to the tray when the armrest member is in the first position and allowing access to the tray when the armrest member is in the second position.

* * * * *